(12) United States Patent
Koch et al.

(10) Patent No.: US 7,715,538 B2
(45) Date of Patent: *May 11, 2010

(54) PRIVACY SCREENING SERVICES

(75) Inventors: Robert Koch, Norcross, GA (US);
Genniman Wood, Orlando, FL (US);
Kevin Forsberg, Orlando, FL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1079 days.

This patent is subject to a terminal disclaimer.

(21) Appl. No.: 11/390,768

(22) Filed: Mar. 28, 2006

(65) Prior Publication Data

US 2006/0239429 A1    Oct. 26, 2006

Related U.S. Application Data

(63) Continuation-in-part of application No. 10/425,250, filed on Apr. 29, 2003, now Pat. No. 7,020,259.

(51) Int. Cl.
*H04M 1/56* (2006.01)
(52) U.S. Cl. ............................. 379/142.08; 379/201.01; 379/215.01
(58) Field of Classification Search ............ 379/142.05, 379/201.01, 201.11, 201.02, 207.02, 207.15, 379/211.01, 211.02
See application file for complete search history.

(56) References Cited

U.S. PATENT DOCUMENTS

| | | |
|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,511,111 A | 4/1996 | Serbetcioglu et al. |
| 5,526,406 A | 6/1996 | Luneau |
| 5,550,904 A * | 8/1996 | Andruska et al. ...... 379/127.01 |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,883,942 A | 3/1999 | Lim et al. |

(Continued)

OTHER PUBLICATIONS

U.S. Appl. No. 11/318,110, filed Dec. 2005.

(Continued)

*Primary Examiner*—Creighton Smith
(74) *Attorney, Agent, or Firm*—Scott P. Zimmerman PLLC

(57) ABSTRACT

A privacy screening service allows a subscriber to send a call screening request during a telephone call. The call screening request may comprise a Dual-Tone Multi-Frequency key (e.g., "Touch Tones") on a telephone keypad, a softkey entry on a communications device, and/or a data message from an Internet Protocol phone or client application. The call screening request may store incoming line identification (ICLID) information of the connected communications signal in a database, add the ICLID information to a Do Not Call list, update a subscriber's profile with the ICLID information, and/or storing the ICLID information in a subscriber's blocked communications list. The Do Not Call list, the subscriber's profile, and/or the subscriber's blocked communications list may include communications instructions for the called number as well as include communications instructions for other registered communications addresses (e.g., other telephone numbers, an email address, and other communications addresses of the subscriber).

20 Claims, 11 Drawing Sheets

U.S. PATENT DOCUMENTS

| | | | |
|---|---|---|---|
| 5,905,774 A * | 5/1999 | Tatchell et al. ............ 379/88.04 |
| 5,940,474 A | 8/1999 | Ruus |
| 5,940,475 A | 8/1999 | Hansen |
| 5,999,611 A * | 12/1999 | Tatchell et al. ......... 379/211.02 |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath et al. |
| 6,160,877 A * | 12/2000 | Tatchell et al. .............. 379/197 |
| 6,208,718 B1 | 3/2001 | Rosenthal |
| 6,208,726 B1 | 3/2001 | Bansal et al. |
| 6,219,413 B1 | 4/2001 | Burg |
| 6,259,692 B1 | 7/2001 | Shtivelman et al. |
| 6,307,920 B1 | 10/2001 | Thomson et al. |
| 6,310,946 B1 | 10/2001 | Bauer et al. |
| 6,343,115 B1 | 1/2002 | Foldare et al. |
| 6,347,136 B1 | 2/2002 | Horan |
| 6,356,756 B1 | 3/2002 | Koster |
| 6,434,126 B1 | 8/2002 | Park |
| 6,476,763 B2 | 11/2002 | Allen, Jr. |
| 6,529,500 B1 | 3/2003 | Pandharipande |
| 6,603,977 B1 | 8/2003 | Walsh et al. |
| 6,608,886 B1 | 8/2003 | Contractor |
| 6,622,016 B1 | 9/2003 | Sladek et al. |
| 6,624,754 B1 | 9/2003 | Hoffman et al. |
| 6,661,785 B1 | 12/2003 | Shang et al. |
| 6,665,388 B2 | 12/2003 | Bedingfield |
| 6,665,611 B1 | 12/2003 | Oran et al. |
| 6,674,745 B1 | 1/2004 | Schuster et al. |
| 6,678,357 B2 | 1/2004 | Stumer et al. |
| 6,680,998 B1 | 1/2004 | Bell et al. |
| 6,703,930 B2 | 3/2004 | Skinner |
| 6,718,021 B2 | 4/2004 | Crockett et al. |
| 6,771,742 B2 | 8/2004 | McCalmont et al. |
| 6,792,081 B1 | 9/2004 | Contractor |
| 6,804,338 B1 | 10/2004 | Chen |
| 6,842,448 B1 | 1/2005 | Norris et al. |
| 6,868,074 B1 | 3/2005 | Hanson |
| 6,912,399 B2 | 6/2005 | Zirul et al. |
| 6,940,950 B2 | 9/2005 | Dickinson et al. |
| 2002/0072348 A1 | 6/2002 | Wheeler et al. |
| 2002/0160745 A1 | 10/2002 | Wang |
| 2003/0048891 A1 * | 3/2003 | Broussard et al. ...... 379/201.03 |
| 2003/0152198 A1 * | 8/2003 | Price ......................... 379/67.1 |
| 2003/0211839 A1 | 11/2003 | Baum et al. |
| 2003/0216148 A1 | 11/2003 | Henderson |
| 2004/0037403 A1 | 2/2004 | Koch |
| 2004/0057425 A1 | 3/2004 | Brouwer et al. |
| 2004/0101123 A1 | 5/2004 | Garcia |
| 2004/0140928 A1 | 7/2004 | Cleghorn |
| 2005/0047574 A1 | 3/2005 | Reid |
| 2005/0063519 A1 | 3/2005 | James |
| 2005/0151642 A1 | 7/2005 | Tupler et al. |
| 2005/0175166 A1 | 8/2005 | Welenson et al. |
| 2005/0190750 A1 | 9/2005 | Kafka |
| 2005/0190892 A1 | 9/2005 | Dawson et al. |
| 2005/0232243 A1 | 10/2005 | Adamczyk |
| 2005/0250468 A1 | 11/2005 | Lu |

OTHER PUBLICATIONS

U.S. Appl. No. 11/318,110, filed Dec. 2005.
US 5,905,788, 05/1999, Bauer et al. (withdrawn)

* cited by examiner

PRIVACY SCREENING SERVICES

CROSS REFERENCE TO RELATED APPLICATION

This application is a continuation-in-part of commonly assigned U.S. patent application Ser. No. 10/425,250, filed Apr. 29, 2003 and now issued as U.S. Pat. No. 7,020,259, and incorporated herein by this reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments relate to the field of telephony and of computers and, more particularly, to methods and systems for providing privacy screening services.

Companies and governments are trying to prevent or otherwise filter telemarketing calls. Nearly everyone has experienced an annoying telemarketing call, and every year many people are defrauded by telemarketers. Many products, such as the TELEZAPPER™ attempt to reduce telemarketing calls (TELEZAPPER is a trademark of the Royal Appliance Manufacturing Company, www.royalappliance.com). The United States Federal Trade Commission and many state governments have created "Do Not Call" lists/registries that make it illegal for telemarketers to call a phone number on the list.

Telecommunications service providers also offer services that reduce telemarketing calls. BellSouth Corporation, for example, offers PRIVACY DIRECTOR® service (PRIVACY DIRECTOR® is a registered trademark of BellSouth Intellectual Property Corporation). This service tries to prevent unwanted calls, such as telemarketing calls, from ringing a subscriber's phone. This PRIVACY DIRECTOR® service does not connect a call when the ICLID information is private. That is, the telecommunications switch recognizes when the ICLID information is marked private, so Caller ID cannot recognize the ICLID information. The PRIVACY DIRECTOR® service requires the calling party to i) unblock their telephone number or ii) announce their name. If the calling party unblocks their telephone number, then the ICLID information is delivered with the call and the subscriber's Caller ID displays the number. If the calling party decides to announce their name, the telephone call is routed to a media server. The media server plays an announcement that asks the calling party to record their name. The recorded name is delivered to the called party. The called party, prior to acceptance of the call, hears the recorded name of the calling party. The called party then has the option to accept the call. This PRIVACY DIRECTOR® service puts the called party in control as the recipient of the calls.

Now, however, telemarketers have learned to bypass the PRIVACY DIRECTOR® service. For example, telemarketers have begun to use public communications addresses to get around the PRIVACY DIRECTOR® service by unblocking their caller ID. The telemarketer's telephone number, then, is public as opposed to private. Because the telemarketer's telephone number is public, the PRIVACY DIRECTOR® service does not prevent a connection to the called party. The Caller ID service displays the ICLID information, the subscriber answers the call, and the subscriber is then subjected to the telemarketer's unwanted proposal.

There is, accordingly, a need in the art for rejecting marketing calls in real time after a connection is made. Consumers must have a quick and convenient way of disposing of telemarketers during a live telephone call. Consumers must be able to reject a telemarketer without prolonging the conversation. There is also a need for rejecting telemarketing calls that appeals to those consumers that, by their nature, tend to be more polite and want to let the telemarketer "down easy."

SUMMARY

The exemplary embodiments include methods, systems, computer programs, and/or computer program products for a privacy screening service. According to some of the embodiments, a communications service provider (e.g., a telecommunications provider, a data communications provider such as America Online, a cable communications provider, and other communications providers) provides this privacy screening service. According to some of the exemplary embodiments, a privacy screening service allows a subscriber, in real time during a live telephone call, to send a call screening request during a telephone call. The call screening request may comprise a Dual-Tone Multi-Frequency key (e.g., "Touch Tones") on a telephone keypad, a softkey entry on a communications device, and/or a data message from an Internet Protocol phone or client application. The call screening request is accepted and sent to the intelligence controlling the telecommunications switch. The intelligence controlling the telecommunications switch interprets the call screening request and determines what action is required. As an example, heretofore when a party depressed a touch-tone key during a live telephone call, a tone was generated, yet the telecommunications network did not recognize that tone as requiring an action. This invention, however, implements an action in response to the call screening request. The action could include playing an announcement, terminating the connection, forwarding to voice mail, storing incoming line identification (ICLID) information of the incoming telemarketer's communications signal in a database, adding the ICLID information to a Do Not Call list, updating a subscriber's profile with the ICLID information, and/or storing the ICLID information in a subscriber's blocked communications list. The Do Not Call list, the subscriber's profile, and/or the subscriber's blocked communications list may include communications instructions for the called number as well as include communications instructions for other registered communications addresses (e.g., other telephone numbers associated with the subscriber, an email address of the subscriber, and other communications addresses of the subscriber).

This privacy screening service, for example, could be used to reject telemarketers. When a subscriber receives a telemarketing call, the subscriber may, in real time during the live telephone call, send the call screening request. The subscriber, for example, may enter a Dual-Tone Multi-Frequency tone. The communications network recognizes that Dual-Tone Multi-Frequency tone and plays an announcement to the calling telemarketer. Once the announcement is played, the telecommunications network could also be instructed to automatically terminate the telephone call. This method of rejecting telemarketing calls (i.e., playing the announcement and then terminating the call) would appeal to those subscribers who desire a quick, convenient and, yet, polite method of disposing of telemarketers.

According to other exemplary embodiments, when a subscriber enters the call screening request, other actions could also be taken. The communications network, for example, could forward the telephone call to voicemail. The subscriber, at any time during the telephone call, could forward the other party to voicemail and then retrieve the voicemail message at a later and more convenient time. The call screening request could also cause the ICLID information to be stored, added, and/or communicated to a Do Not Call list/database, a blocked communications list, or any other database. Further, the Do Not Call list/database, the blocked communications list, and/or other data can be associated with other communications addresses associated with the subscriber (e.g., another telephone number of the subscriber such as a work telephone number and/or a cellular phone number, an electronic communications address, and other communications addresses) so that a subsequent communication from the telemarketer to another communications address would be processed according to communications instructions of the called number (e.g., block the incoming communication from the telemarketer). Because the subscriber need only enter the call screening request to add the ICLID information to the Do Not Call list/database, the privacy screening service provides a very quick and convenient method of preventing telemarketing calls, emails, and other communications to the called number and to other registered communications addresses of the subscriber. Further exemplary embodiments of the privacy screening service allow the subscriber to even maintain various Do Not Call lists, such as a list for a wireless communications device, a list for a wireline communications device (e.g., a POTS phone), a list for a spouse, a list for a child, and other such Do Not Call lists. The subscriber could also have a combined Do Not Call list in which multiple lines and/or devices access a single list. This invention could also communicate the ICLID information to a state Do Not Call database or a federal Do Not Call database. When the subscriber enters the call screening request, the telecommunications network could automatically add the ICLID information to various databases, thus further reducing unwanted calls.

Some of the exemplary embodiments of the privacy screening service also help the subscriber prove violations of Do Not Call lists. For example, some state and federal laws prohibit telemarketing calls to telephone numbers on these Do Not Call lists. When a telemarketer calls, and the subscriber sends the call screening request to add the ICLID information to a Do Not Call list, the telecommunications network could "tag" the telemarketing call with a date and time. When future telemarketing telephone calls are received, this privacy screening service could automatically determine if the telemarketer previously called in violation of the Do Not Call list. The privacy screening service could alert the subscriber and provide dates and times of the violating telemarketing calls, emails, or other communications. The subscriber would then have evidence to pursue legal action against the telemarketer.

Some of the exemplary embodiments are applicable to non-telemarketing communications and situations. The voicemail feature, for example, would also appeal to anyone requiring voicemail during a live telephone call. When, for example, a more important situation arises during the telephone call, the subscriber may forward the other party to voicemail, tend to the important situation, and later retrieve the voicemail message.

According to some of the exemplary embodiments, a privacy screening service monitors a telephone call for a call screening request. The telephone call is from a calling telephone number to a called telephone number. An action is taken in response to the call screening request. The action could include playing an announcement, terminating the connection, forwarding to voice mail, storing the ICLID information in a database, adding the ICLID information to a Do Not Call list, updating a subscriber's profile with the ICLID information, and/or storing the ICLID information in a subscriber's blocked communications list. The call screening request could comprise a Dual-Tone Multi Frequency tone, a softkey entry, and/or a data message.

Other exemplary embodiment provide a privacy screening service that processes a telephone call from a calling telephone number to a called telephone number. After a connection between the ICLID information and the called telephone number, the telephone call is monitored for a call screening request. Upon entry of the call screening request, an action is taken in response to the call screening request. The action could include playing an announcement, terminating the connection, forwarding to voice mail, storing the ICLID information in a database, adding the ICLID information to a Do Not Call list, updating a subscriber's profile with the ICLID information, and/or storing the ICLID information in a subscriber's blocked communications list.

Still another exemplary embodiment describes yet another method for providing this privacy screening service. A telephone call is received at a telecommunications switch, and the telephone call is from a calling telephone number to a called telephone number. The telephone call is connected to the called telephone number. A call screening request is received from the called telephone number, and an action is taken in response to the call screening request. The action could include playing an announcement, terminating the connection, forwarding to voice mail, storing the ICLID information in a database, adding the ICLID information to a Do Not Call list, updating a subscriber's profile with the ICLID information, and/or storing the ICLID information in a subscriber's blocked communications list.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following description taken in connection with the accompanying figures, wherein.

DETAILED DESCRIPTION

Figure 1:
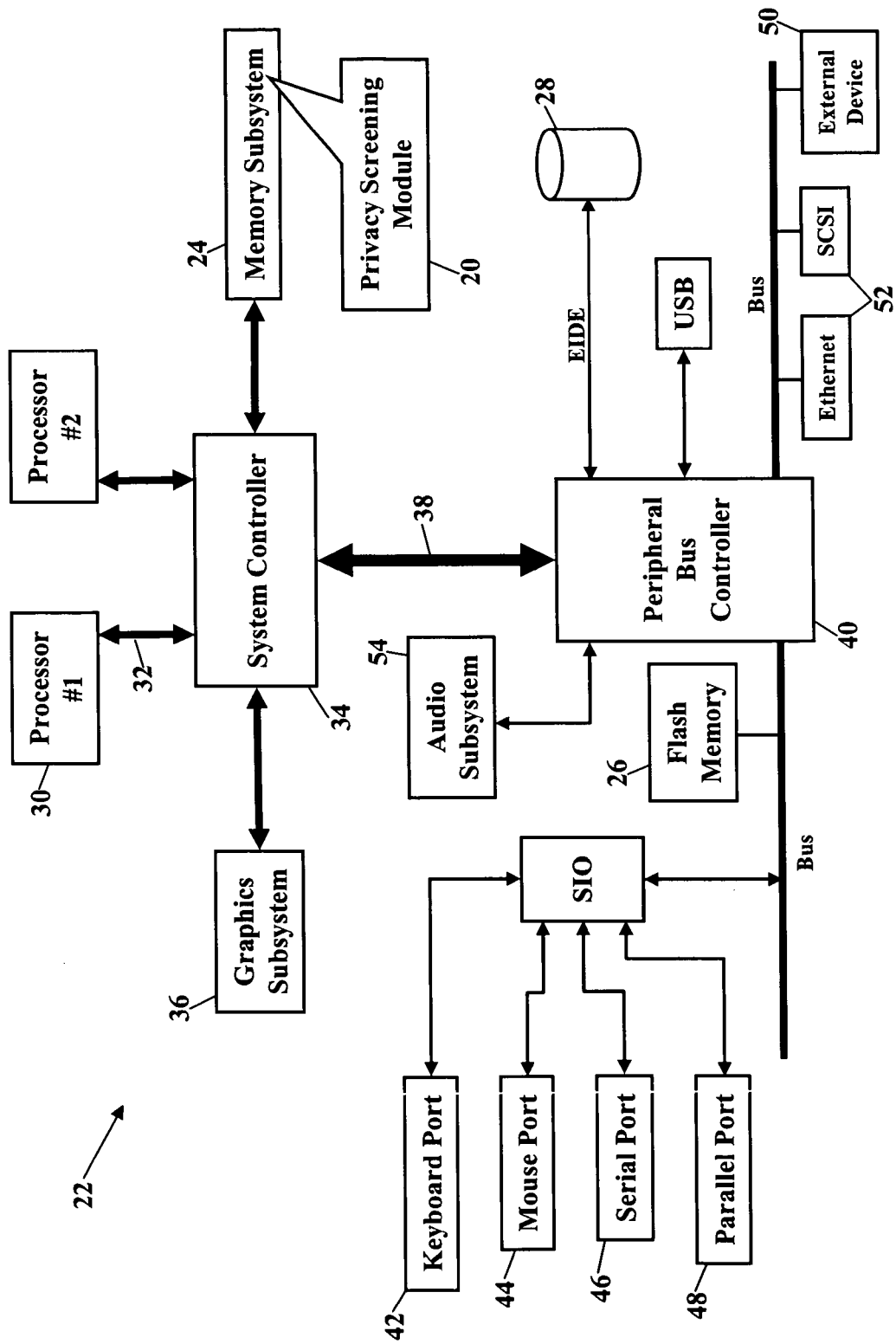
FIG. 1 is a block diagram showing a Privacy Screening Module residing in a computer system according to some of the exemplary embodiments.

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

The exemplary embodiments include methods, systems, computer programs, and/or computer program products for providing privacy screening services. According to some of the exemplary embodiments, a privacy screening service allows a subscriber, in real time during a live telephone call, to send a call screening request during a telephone call. The call screening request may comprise a Dual-Tone Multi-Frequency key (e.g., "Touch Tones") on a telephone keypad, a softkey entry on a communications device, and/or a data message from an Internet Protocol phone or client application. The call screening request is accepted and sent to the intelligence controlling the telecommunications switch. The intelligence controlling the telecommunications switch interprets the call screening request and determines what action is required. As an example, heretofore when a party depressed a touch-tone key during a live telephone call, a tone was generated, yet the telecommunications network did not recognize that tone as requiring an action. This invention, however, implements an action in response to the call screening request. The action could include playing an announcement, terminating the connection, forwarding to voice mail, storing incoming line identification (ICLID) information of the incoming telemarketer's communications signal in a database, adding the ICLID information to a Do Not Call list, updating a subscriber's profile with the ICLID information, and/or storing the ICLID information in a subscriber's blocked communications list. The Do Not Call list, the subscriber's profile, and/or the subscriber's blocked communications list may include communications instructions for the called number as well as include communications instructions for other registered communications addresses (e.g., other telephone numbers associated with the subscriber, an email address of the subscriber, and other communications addresses of the subscriber).

Figure 2:
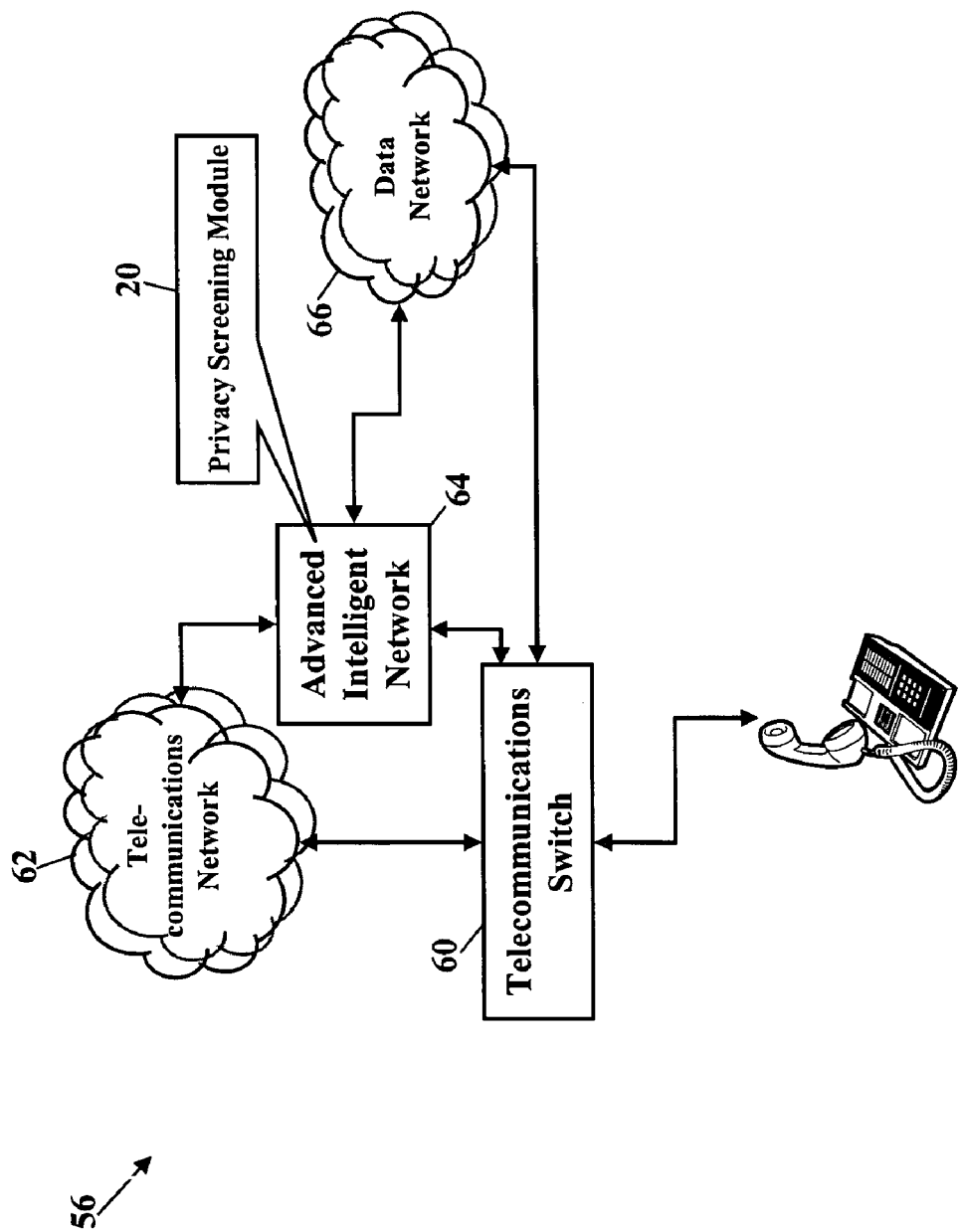
FIG. 2 is a schematic showing the Privacy Screening Module operating within an intelligently-controlled telecommunications network according to some of the exemplary embodiments.
Figure 3:
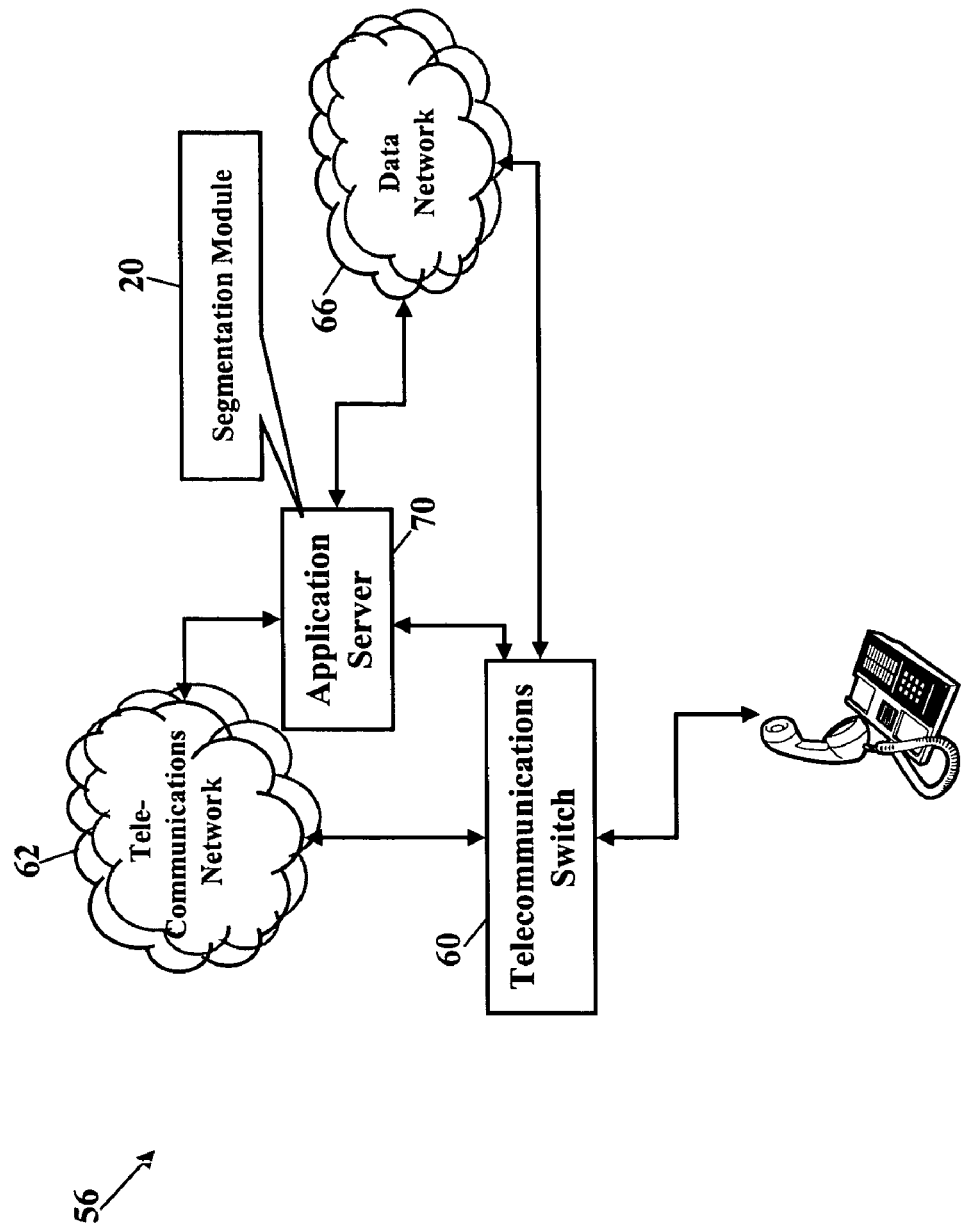
FIG. 3 is a schematic showing the Privacy Screening Module operating within a packet network architecture according to some of the exemplary embodiments.

FIGS. 1-3 depict possible operating environments for exemplary embodiments of this invention. A Privacy Screening Module 20 includes computer programs, computer systems, and telecommunications systems that allow a subscriber, in real time during a live telephone call, to take actions during the call. The Privacy Screening Module 20, for example, allows the subscriber to hit a Dual-Tone Multi-Frequency key, a softkey, and/or a data message to play an announcement to the other party. This announcement may be a recording that rejects the caller, and the Privacy Screening Module 20 could then automatically terminate the telephone call. Because the announcement may be personalized, the wording and tone of the announcement can be tailored to the subscriber's personality (e.g., a "soft" rejection or a "hard" rejection). The call screening request could alternatively forward the call to voice mail, thus still allowing the calling party to leave a message. The Privacy Screening Module 20, however, also offers the subscriber the ability to add information associated with the ICLID signal of the incoming marketing communication (e.g., name of calling party, communications address such as a telephone number of the calling party, a geographic location of the calling party, an identifier that the incoming communication is from a cellular phone, and other information transmitted with the ICLID signal of the incoming marketing communication) to a Do Not Call list and add the ICLID information to the subscriber's blocked communications list.

FIG. 1 is a block diagram showing the Privacy Screening Module 20 residing in a computer system 22. The Privacy Screening Module 20 operates within a system memory device. The Privacy Screening Module 20, for example, is shown residing in a memory subsystem 24. The Privacy Screening Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com); International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

An exemplary operating system is WINDOWS® (WINDOWS® is a registered trademark of Microsoft Corporation, One Microsoft Way, Redmond Wa. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, mc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic showing the Privacy Screening Module 20 operating within an intelligently-controlled telecommunications network 56. This telecommunications network 56 further represents an operating environment for the Privacy Screening Module 20. The telecommunications network 56 includes a telecommunications switch 60 of a Public Switched Telephone Network 62. The telecommunications switch 60 includes Advanced Intelligent Network (AIN) componentry 64 controlling many features of the telecommunications switch 60. The Advanced Intelligent Network (AIN) componentry 64 would include the Privacy Screening Module 20 operating within the computer system (shown as reference numeral 22 in FIG. 1). The telecommunications switch 60 and the Advanced Intelligent Network (AIN) componentry 64 may also interface with a data network 66. The signaling between the telecommunications switch 60, the Public Switched Telephone Network 62, the Advanced Intelligent Network 64, and the data network 66, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

FIG. 3 is similar to FIG. 2, yet FIG. 3 illustrates an exemplary packet network architecture. This exemplary packet network represents an alternative operating environment for the Privacy Screening Module 20. Here the telecommunications switch 60 includes a packet-based "softswitch." This softswitch uses software control to provide voice, data, and video services by dynamically changing its connection data rates and protocols types. An application server 68 interfaces with the softswitch via a packet protocol, such as Session Initiation Protocol (SIP). This application server 68 includes voice service protocols, triggers, and operations that allow the Public Switched Telephone Network 62 and the data network 66 to interoperate.

Figure 4:
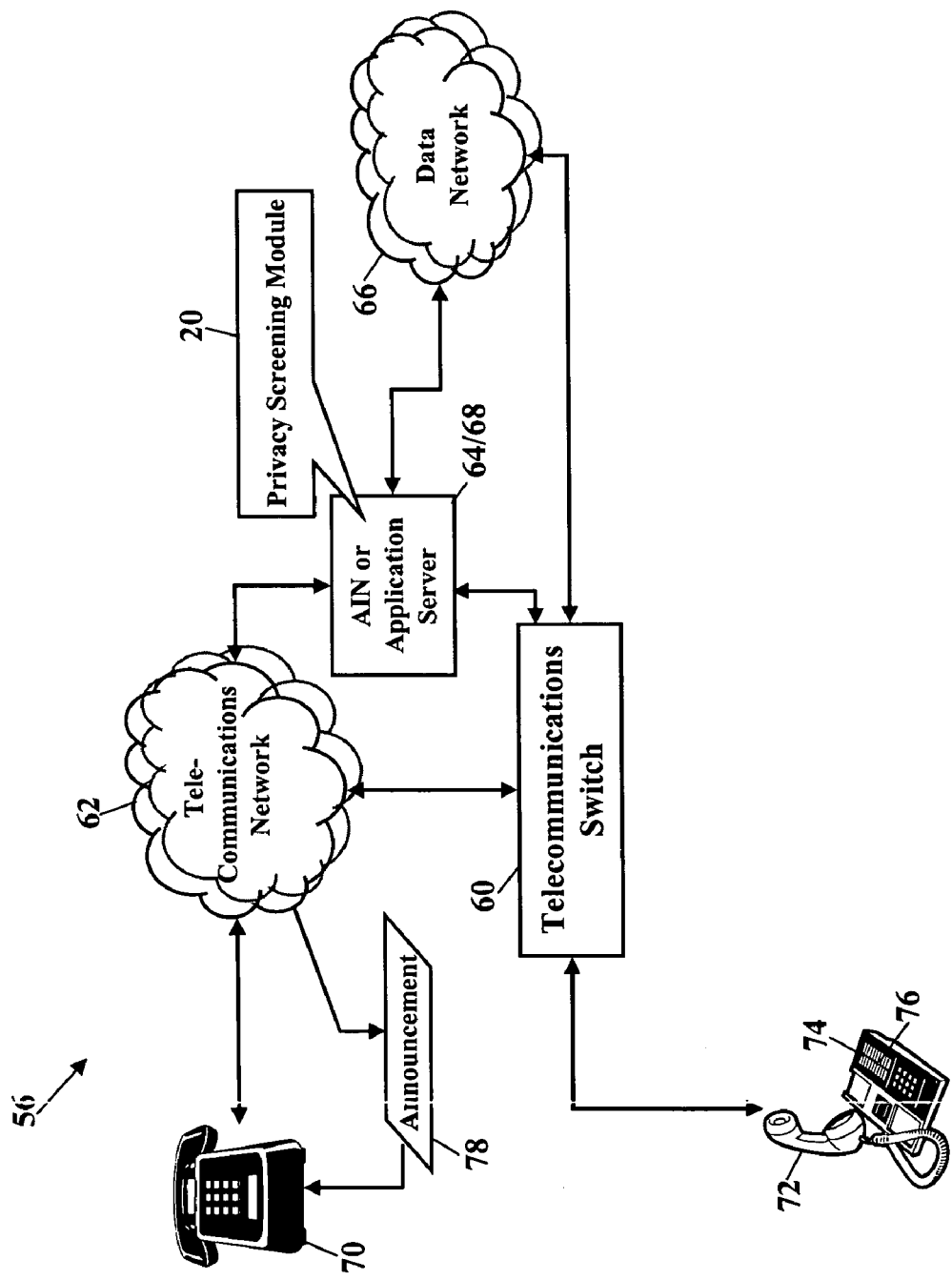
FIG. 4 is a schematic illustrating an exemplary embodiment of providing privacy screening services.

FIG. 4 is a schematic illustrating an exemplary embodiment of providing privacy screening services during telephone calls. Here the Privacy Screening Module 20 allows a subscriber, in real time during a live telephone call, to take actions during the call. If either party to the telephone call is a subscriber to this privacy screening service, the Privacy Screening Module 20 allows the subscriber to utilize a call screening request during the telephone call. The call screening request may comprise a Dual-Tone Multi-Frequency tone on a telephone keypad, a softkey on a similar keypad, and/or a data message (e.g., an SIP message). As FIG. 4 shows, a telephone call is placed from a calling telephone number 70 (hence the calling party) to a called telephone number 72 (the called party). The telephone call is processed from the calling party (the incoming communications signal with the incoming line identification information 70), into the Public Switched Telephone Network 62, and to the destination telecommunications switch 60 serving the called party (the called telephone number 72). The intelligence controlling the destination telecommunications switch 60 detects a trigger that identifies either party as a subscriber to this privacy screening service. The destination telecommunications switch 60 is then instructed to establish a connection between the ICLID information and the called telephone number, thus allowing the parties to converse.

Once the connection is established, the live telephone call is monitored for the call screening request. The live telephone call is monitored for the next event, and that event is entry of the call screening request. The terms "monitor," "monitoring," and "monitored" mean the telecommunications network 56 listens for, and/or is able to detect, a Dual-Tone Multi-Frequency tone signal, entry of a softkey, or receipt of a data message. The telecommunications switch 60, for example, may listen for the Dual-Tone Multi-Frequency tone, or the telecommunications switch 60 may be instructed to listen for the Dual-Tone Multi-Frequency tone. The terms "monitor," "monitoring," and "monitored" may also mean the Advanced Intelligent Network componentry 64, or the application server 68, listens for the Dual-Tone Multi-Frequency tone. The Advanced Intelligent Network componentry 64, or the application server 68, could instruct or command some portion of the telecommunications network 56 to listen for the Dual-Tone Multi-Frequency tone. As those of ordinary skill in the art understand, Dual-Tone Multi-Frequency signaling is a means of transferring information from a party to the telecommunications network 56 through the use of in-band audio tones. Each digit of information is assigned a simultaneous combination of one of a lower group of frequencies and one of a higher group of frequencies to represent each digit or character. The telecommunications network 56 monitors the telephone call for the next event to happen—in this case, the next event is entry of a Dual-Tone Multi-Frequency tone. That Dual-Tone Multi-Frequency tone is accepted and sent to the intelligence controlling the telecommunications switch 60 (such as the Advanced Intelligent Network componentry 64 or the application server 68) for interpretation and for an action.

Upon entry of a Dual-Tone Multi-Frequency tone, the telecommunications network 56 takes an action. This invention allows the subscriber to utilize the touch-tone keys 74 on the telephone keypad 76 during the telephone call. Heretofore when a party depressed a touch-tone key 74 during a live telephone call, a tone was generated, yet the telecommunications network 56 did not recognize that tone as requiring an action. This invention, however, implements an action in response to the Dual-Tone Multi-Frequency tone. This invention, for example, launches a next event list and arms the T_DTMF_ENTERED event in the authorize termination message. This event could make the telecommunications switch 60 listen in on the telephone call and wait for a DTMF event. When the subscriber presses any key 74 on the keypad 76, and hangs up, the Privacy Screening Module 20 launches an event back to the Advanced Intelligent Network 64 (e.g., a Service Control Point). The Advanced Intelligent Network 64 checks the digit that was entered by the subscriber and takes the appropriate action. The action could include playing an announcement, terminating the connection, forwarding to voice mail, storing the ICLID information in a database, adding the ICLID information to a Do Not Call list, updating a subscriber's profile with the ICLID information, and/or storing the ICLID information in a subscriber's blocked communications list.

A call screening request, for example, could be used to reject incoming marketing communications such as solicitations. For example, when a subscriber receives a telemarketing call, the subscriber may, in real time during the live telephone call, enter the call screening request. The subscriber, for example, could hit a Dual-Tone Multi-Frequency key 74 on the keypad 76, hit a softkey on the keypad, or send a data message from a computer device. The telecommunications network 56 recognizes that call screening request tone as requiring an action. Here, for example, that action might be playing an announcement 78 to the calling party. This announcement 78 might be a network-based "telemarketing slam" that rejects the telemarketer. Once the announcement 78 is played, the telecommunications network 56 could also be instructed to terminate the connection between the ICLID information and the called telephone number. This method of rejecting telemarketing calls (i.e., playing the announcement 78 and then terminating the call) would appeal to those subscribers who desire a quick, convenient and, yet, polite method of disposing of telemarketers.

Another action might be voicemail. When a subscriber receives a telephone call, the subscriber may, in real time during the live telephone call, enter the call screening request. The subscriber, for example, could hit the Dual-Tone Multi-Frequency key 74 on the keypad 76, hit a softkey on the keypad, or send a data message from a computer device. The telecommunications network 56 recognizes that call screening request as requiring an action. Here the action is forwarding the telephone call to voicemail. At any time during the telephone call the subscriber could forward the other party to voicemail. The other party would hear the subscriber's voicemail announcement. The other party to the telephone call could then record a voicemail message, and the subscriber could retrieve this voicemail message at a later time. If, for example, a subscriber is intrigued by a telemarketing proposal, yet does not want to talk with the telemarketer, the subscriber could enter a Dual-Tone Multi-Frequency tone and forward the telemarketer to voicemail. The subscriber could then retrieve the voicemail message at later and more convenient time.

This voicemail feature, however, is not only for telemarketing. This voicemail feature would also appeal to anyone requiring voicemail during a live telephone call. When, for example, a more important situation arises during the telephone call, the subscriber may forward the other party to voicemail, tend to the important situation, and later retrieve the voicemail message.

The announcement 78 could be personalized. The subscriber could access the intelligence controlling the telecommunications switch 60 and record a personalized announcement 78. The subscriber, for example, could access a media server using a toll-free administrative telephone number. The media server could utilize Caller ID to recognize the subscriber's home telephone number, or the media server could prompt for a subscribing telephone number. The media server steps the subscriber through a series of prompts and allows the subscriber to record the personalized announcement 78. The personalized announcement 78 could be any greeting, message, or telemarketing rejection. The personalized announcement 78 could be stored as a specific file in the media server. When the subscriber then enters a DTMF during a live telephone call, the telecommunications switch 60 could then play the personalized announcement 78. The telecommunications switch 60, instead, could be instructed to forward the telephone call to the media server for the personalized announcement 78. The subscriber might have a number of different personalized announcements, and the particular announcement depends upon which DTMF is entered. If the subscriber, for example, enters a "4" on the keypad 76, the telecommunications switch 60 sends the telephone call to the intelligence (e.g., the AIN 64 or the application server 68). The intelligence recognizes that Dual-Tone Multi-Frequency tone as requiring an action, and this action is playing the particular personalized announcement 78 corresponding to the DTMF. The intelligence returns instructions to the telecommunications switch 60 to forward that telephone call to the media server. The media server accesses the particular personalized announcement corresponding to the called telephone number and the DTMF. The media server then plays the particular personalized announcement 78.

Figure 5:
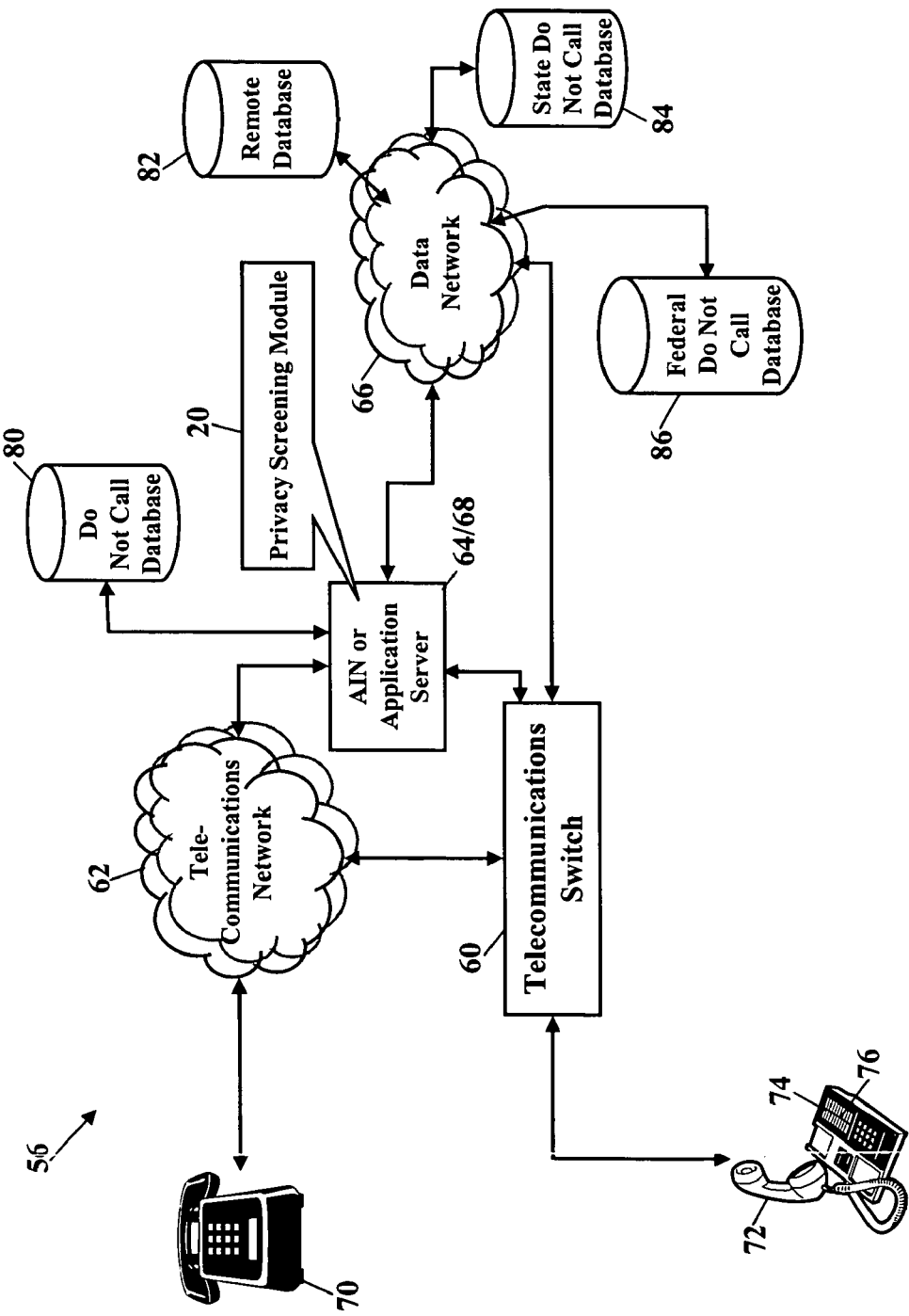
FIG. 5 is a schematic illustrating an exemplary embodiment of storing ICLID information of the incoming communication in a database.

FIG. 5 is a schematic illustrating another exemplary embodiment for providing privacy screening service during telephone calls. Here the action taken is storing the ICLID information associated with the incoming marketing communication in a database. When the subscriber enters the call screening request, for example, the telecommunications network 56 could add the ICLID information to a Do Not Call list/database 80. This Do Not Call list/database 80 could contain one or more telephone numbers and/or other communications addresses (e.g., email address, IP address, and other communications addresses) of a subscriber that do not wish to receive telemarketing calls. As used herein, the term "subscriber" includes customers, consumers, and users of a communications device at a communications address (e.g., the called number, an email address, a cell phone number, etc.). Because the subscriber need only enter the call screening request to add/register a communications address (e.g., telephone number) to the Do Not Call list/database 80, the privacy screening service provides a very quick and convenient method of preventing subsequent marketing communications. Further, the call screening request could also update other Do Not Call lists, such as wireless versions, wireline versions, electronic communications addresses, a spouse's version, a kid's version, and/or combined versions. When the call screening request is entered, the ICLID information of the incoming marketing communication could be forwarded to a remote database 82 via the data network 66. The remote database 82, for example, could be a government Do Not Call list. The ICLID information, for example, could be communicated to a state's Do Not Call database 84 or a federal Do Not Call database 86 via the data network 66. The state Do Not Call database 84 could be provided by a state governmental agency (e.g., the state attorney general). The federal Do Not Call database 86 could be provided by a federal agency (e.g., the Federal Trade Commission). When the subscriber enters the call screening request, the telecommunications network 56 could automatically add the ICLID information to various databases, thus further reducing unwanted telemarketing calls.

This privacy screening service also helps the subscriber prove violations of Do Not Call lists. Some state and federal laws prohibit telemarketing calls to telephone numbers on these Do Not Call lists. Because the telecommunications network 56 maintains a date and a time of any telephone call, the telecommunications network 56 could "tag" each telemarketing call. When the subscriber enters the call screening request, and the telecommunications network 56 adds/communicates the ICLID information to a Do Not Call list/database 80, the communication could also include the date and time of the telemarketer's telephone call. When future telephone calls are received, the telecommunications network 56 could query the Do Not Call list/database for the ICLID information. If a match is found, the privacy screening service could alert the subscriber and provide dates and times of the matching telephone numbers. The subscriber would then have evidence to pursue legal action against the telemarketer.

Figure 6:
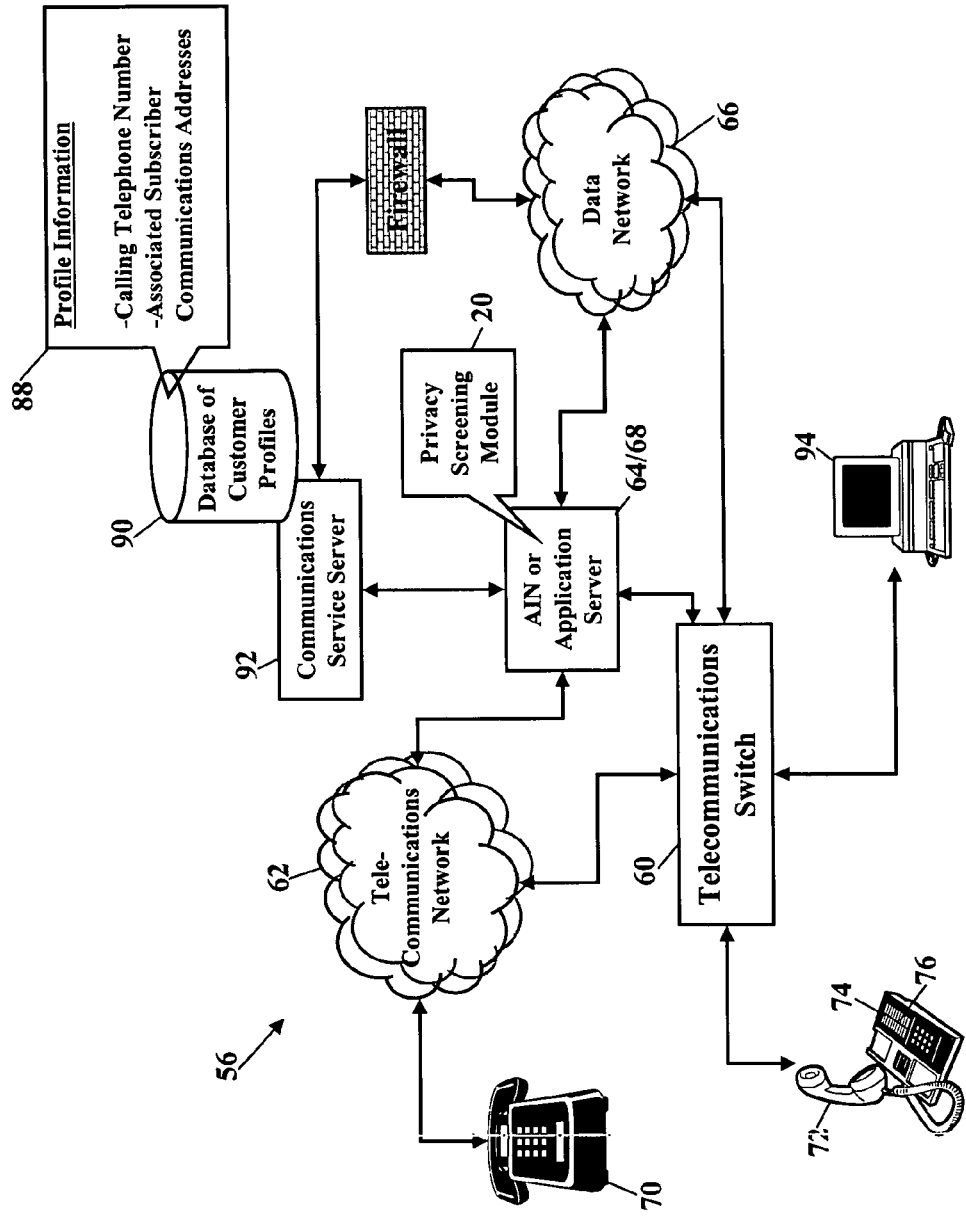
FIG. 6 is a schematic illustrating another exemplary embodiment for updating a subscriber's profile information with the ICLID information.

FIG. 6 is a schematic illustrating still another exemplary embodiment for providing privacy screening service during telephone calls. When the subscriber sends the call screening request during a live telephone call, the telecommunications network 56 recognizes that call screening request (such as a Dual-Tone Multi-Frequency tone) as requiring an action. Here the action comprises updating a subscriber's profile information 88 with the ICLID information of the incoming marketing communication. The subscriber's profile information 88 is stored in a database 90 of customer profiles. The database 90 of customer profiles is maintained on the Advanced Intelligent Network 64 or the application server 68 or, as FIG. 6 shows, a communications service server 92 communicates with the Advanced Intelligent Network 64 or the application server 68. The database 90 of customer profiles could also be maintained on a computer/server operating on the data network 66.

The profile information 88 is updated with the ICLID information. That is, when the subscriber enters the call screening request during a live telephone call, the action taken comprises storing the ICLID information in a subscriber's blocked communications list. The subscriber's blocked communications list contains calling telephone numbers (and other marketing communications addresses, such as an identifier of that the incoming call is from a cell phone in Florida) that the subscriber wishes to block. When the telecommunications switch 60 receives a subsequent telephone call, the intelligence controlling the switch 60 (the Advanced Intelligent Network 64 or the application server 68) suspends processing of the telephone call. A query is sent to determine if the ICLID information is found in the customer's profile information 88 and, hence, blocked from receipt. If the ICLID information is blocked, the caller is offered no additional opportunity to bypass the block. The ICLID information could also be added to related profiles, such as a spouse's profile, a child's profile, a wireless profile, and a wireline profile. Further, the profile information 88 may also include other associated subscriber communications addresses (e.g., a cell phone number, a work telephone number, an email address, and other communications addresses) that the subscriber wants to prevent subsequent communications from the calling party. That is, the telemarketer would be blocked from calling multiple communications addresses of the subscriber.

Figure 7:
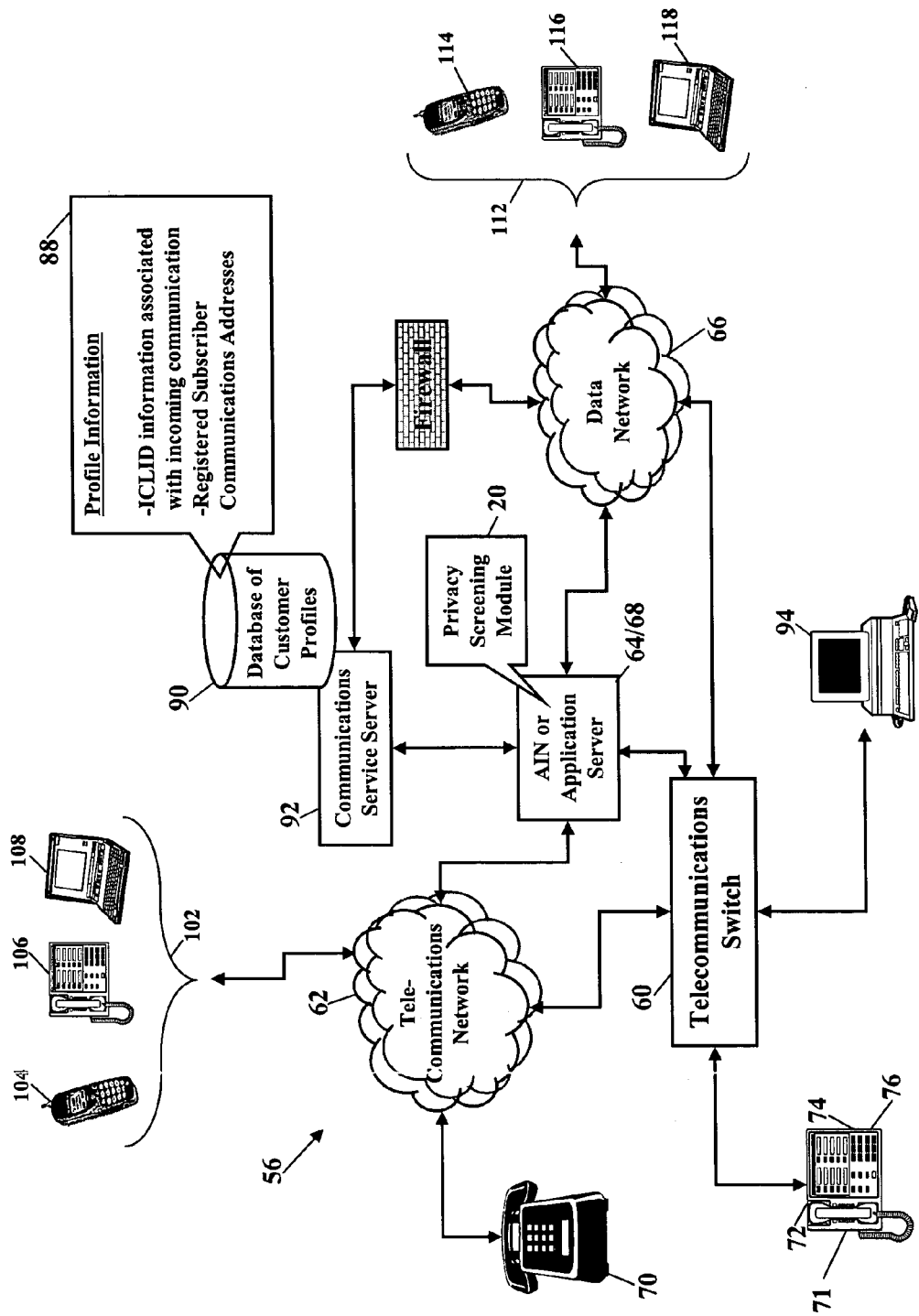
FIG. 7 is a schematic illustrating still another exemplary embodiment for updating the subscriber's profile information with the ICLID information.

FIG. 7 is a schematic illustrating an exemplary embodiment for providing privacy screening services to one or more other registered subscriber telecommunications addresses and/or one or more other registered subscriber data communications addresses. For example, the Do Not Call list may be associated with multiple telecommunications addresses 102 of the subscriber (e.g., the called number, a work telephone number, a cellular phone number, and other telecommunications addresses). Optionally, the Do Not Call list may also be associate with data communications addresses 112, such as an email address, and Internet Protocol based address, and other data communications addresses. These other registered communications addresses 102, 112 are stored with the profile information 88 in the database of customer profiles 90. When a subsequent incoming communication is placed from the calling party to one of the registered subscriber communications addresses 102, 112, the subsequent incoming communication to the registered subscriber communications address 102, 112 may also be blocked from receipt (or alternatively, the incoming communication is processed according to the profile information, such as routing to voice mail, updating a state or federal database, etc.). The registered telecommunications addresses 102 may include communications addresses for a cellular phone 104, another telephone 106, and another personal computer 108. Similarly, the registered data communications addresses 112 may include another cellular phone 114, another telephone 116, and another personal computer 118. Still further, these associated communications devices 102, 112 may also include a Voice over Internet Protocol (VoIP) phone and other communications devices.

As those of ordinary skill understand, the subscriber's profile information 88 relates to the subscriber's communications services. The specific information related to the provision, presence, and/or availability of these communication services is termed the "profile information" 88. This profile information 88 may include information related to the subscriber's calendar (e.g., appointments and activities), travel itinerary information, presence and availability information, other associated subscriber communications addresses, and the subscriber's patterns of behavior. If the reader wishes to learn more about the profile information 88, and how the subscriber may view, add, delete, and otherwise define the subscriber's communications services and the profile information 88, the reader is referred to the commonly-assigned U.S. application Ser. No. 10/012,746, filed Dec. 7, 2001, and which the "Summary" and "Detailed Description" sections are incorporated herein by reference. The reader is also directed to the commonly assigned U.S. application Ser. No. 10/107,616, filed Mar. 27, 2002, and which the "Brief Summary of the Invention" and "Detailed Description of the Invention" sections are incorporated herein by reference.

The profile information 88 may also be accessed by the subscriber. The subscriber may use a computer system 94 to access the communications service server 92 via a connection to the telecommunications switch 60 and a connection to the data network 66. The computer system 94 allows the subscriber to access the subscriber's profile information 88 and view/edit/delete information. Although the call screening request causes an automatic update of the blocked communications list, the subscriber could also access the profile information 88 and add telephone numbers to the list of blocked telephone numbers.

Figure 8:
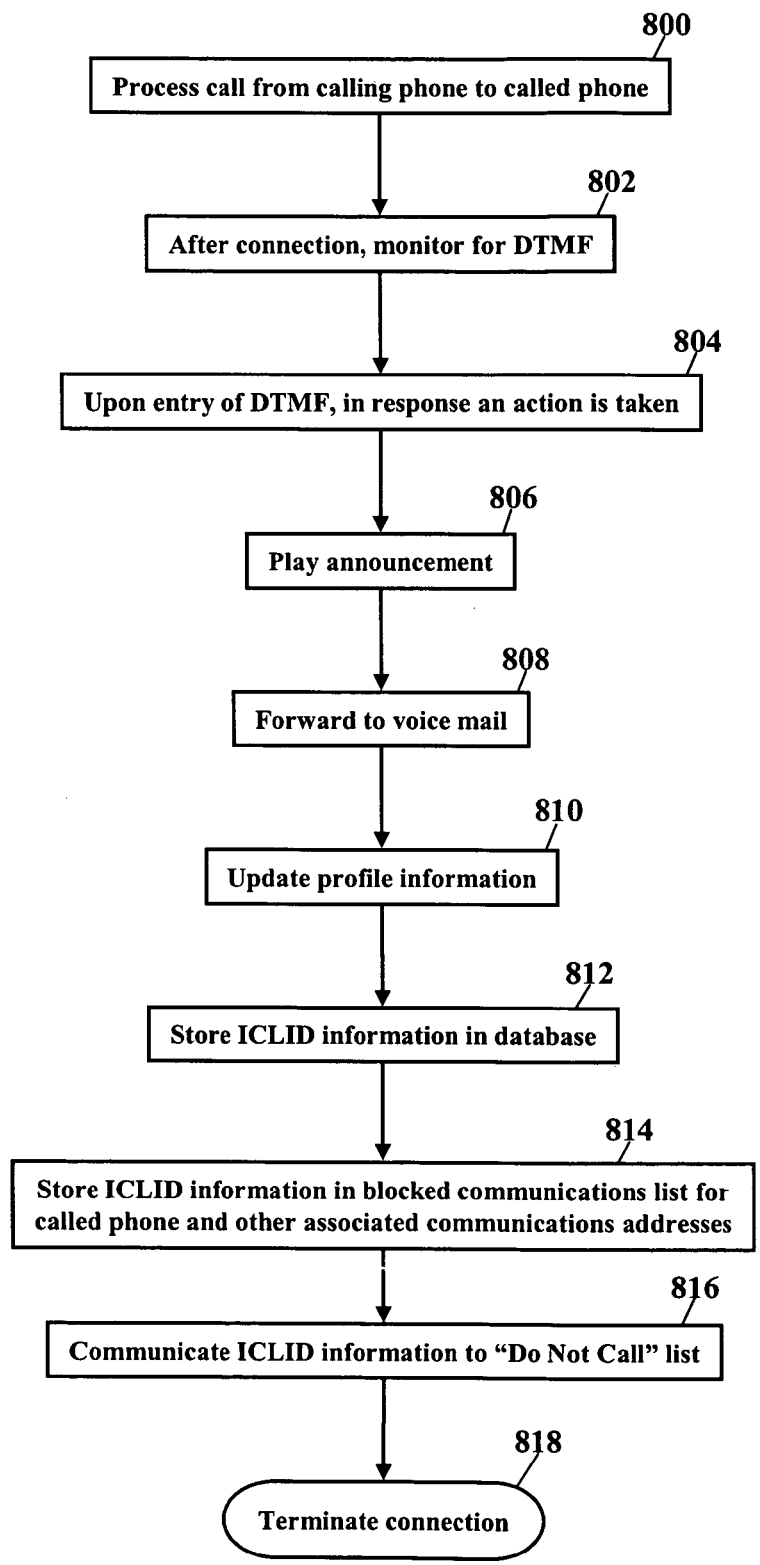
FIG. 8 is a flowchart showing an exemplary method of providing privacy screening services.

FIG. 8 is a flowchart showing a method of providing privacy screening service. A telephone call is processed from a calling telephone number to a called telephone number (Block 800). The term "processing," as used herein, encompasses every event from the time the ICLID information (shown as reference numeral 70 in FIGS. 4-7) goes off-hook to the termination of the telephone call. "Processing" of the telephone call includes routing a voice path and signaling setup and intelligence (e.g., Local Number Portability queries, queries to retrieve Calling Name/Number information, intelligence queries by the AIN 64 or the applications server 68, and standard signaling messages to determine call routing paths). The term "processing" also includes monitoring an established telephone call for possible Dual-Tone Multi-Frequency tone entry, switch hook flash, other events that indicate a party on the telephone call has requested an action, and delivery of call-waiting tones and data. "Processing," however, also encompasses billing activities and measurements at the telecommunications switch 60 or other telecommunications network 56 element.

After a connection between the ICLID information and the called telephone number, the telephone call is monitored for an event (Block 802). Here, that event is entry of a call screening request, such as a Dual-Tone Multi-Frequency tone. Upon entry of the Dual-Tone Multi-Frequency tone, an action is taken in response to the Dual-Tone Multi-Frequency tone (Block 804). The action might comprise playing an announcement (Block 806), forwarding the telephone call to voice mail (Block 808), and updating a subscriber's profile with the ICLID information (Block 810). The action might also comprise storing the ICLID information in a database (Block 812), storing the ICLID information in the subscriber's blocked communications list for the called phone and for other associated communications addresses (Block 814), and/or communicating the ICLID information to a Do Not Call list (Block 816). The Do Not Call list could be maintained by a telecommunications service provider, a data communications provider, a third party, a state government entity, and/or a federal government entity. The action could also comprise terminating the connection (Block 818).

Figure 9:
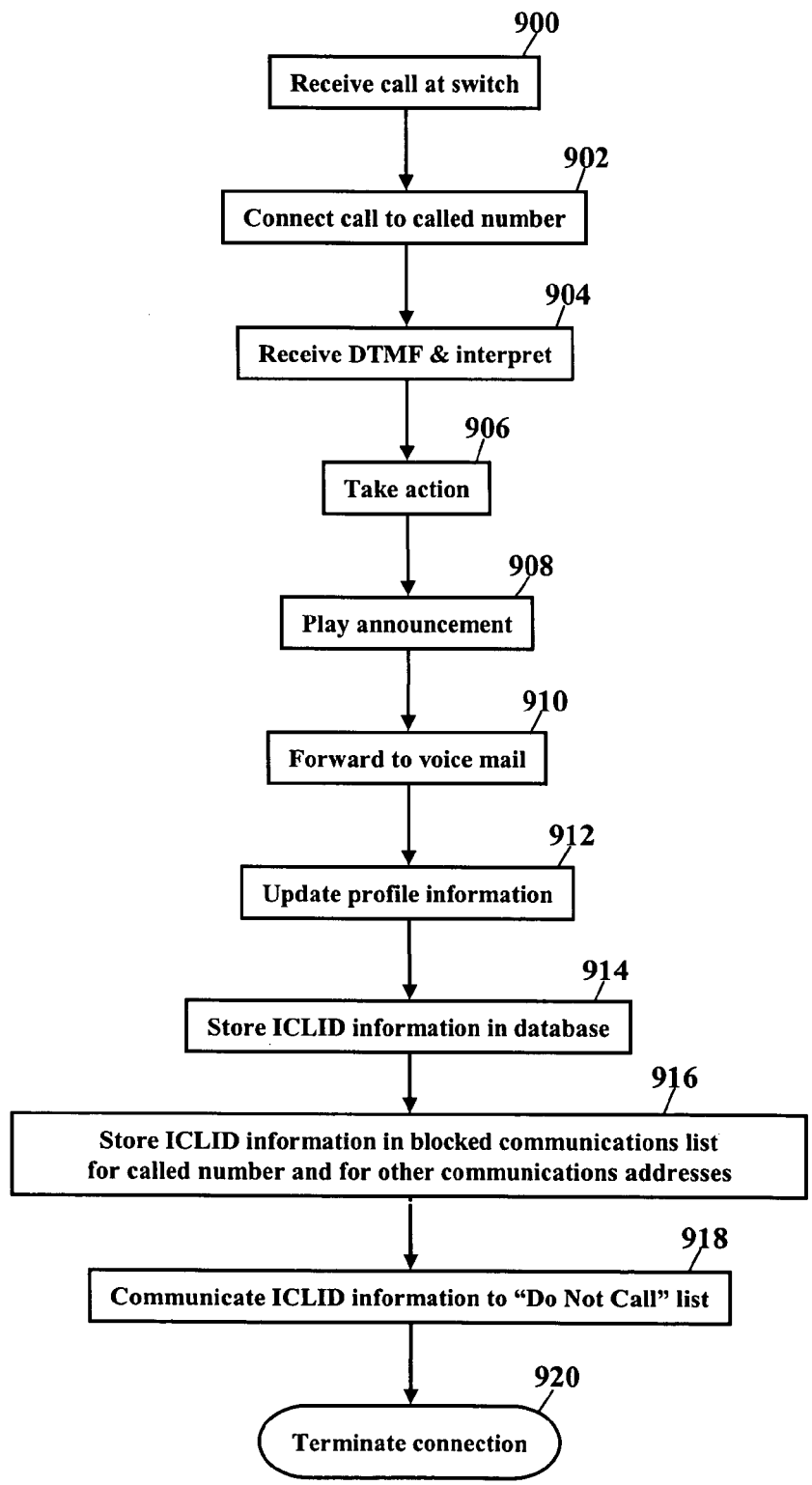
FIG. 9 is a flowchart showing another exemplary method of providing privacy screening services.

FIG. 9 is a flowchart showing another method of providing privacy screening service. A telephone call is received at a telecommunications switch (Block 900). The telephone call is from a calling telephone number to a called telephone number. The telephone call is connected to the called telephone number (Block 902). A call screening request, such as a Dual-Tone Multi-Frequency tone, is received from the called telephone number (Block 904), and an action is taken in response to the call screening request (Block 906). The action might comprise playing an announcement (Block 908), forwarding the telephone call to voice mail (Block 910), and updating a subscriber's profile with the ICLID information (Block 912). The action could also comprise storing the ICLID information in a database (Block 914), storing the ICLID information in a subscriber's blocked communications list for the called phone and for other associated communications addresses (Block 916), and communicating the ICLID information to a Do Not Call list (Block 918). The action also comprises terminating the connection (Block 920).

Figure 10:
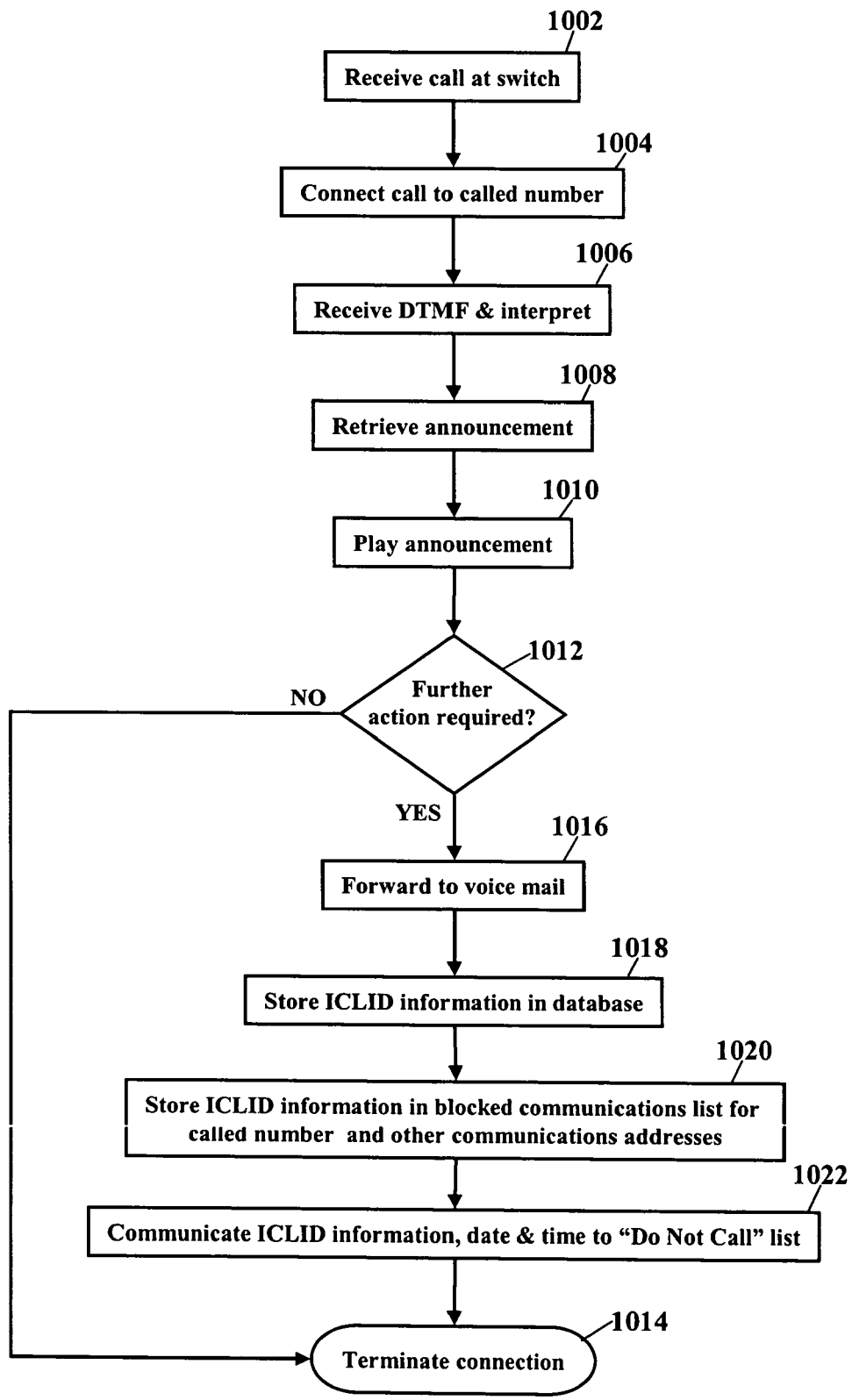
FIG. 10 is a flowchart showing still another exemplary method of providing privacy screening services.

FIG. 10 is a flowchart showing still another method of providing privacy screening service. A telephone call is received at a telecommunications switch (Block 1002). The telephone call is from a calling telephone number to a called telephone number. The telephone call is connected to the called telephone number (Block 1004). A Dual-Tone Multi-Frequency tone is received from the called telephone number (Block 1006), and an announcement is retrieved from memory (Block 1008). The announcement may correspond to the Dual-Tone Multi-Frequency tone(s) received from the called telephone number, and the announcement may be a network-based announcement and/or a personalized prerecorded announcement. The announcement is played to the ICLID information (Block 1010). If no further action is required (Block 1012), the connection is terminated (Block 1014) after playing the announcement. If further action is required (Block 1012), the telephone call may be forwarded to voice mail (Block 1016), the ICLID information may be stored in a database (Block 1018), and the ICLID information may be added to a list of blocked telephone numbers or other communications addresses (Block 1020). The called telephone number, the date of the call, and the time of the call may be communicated to a Do Not Call list (Block 1020). The connection is then terminated (Block 1014).

Figure 11:
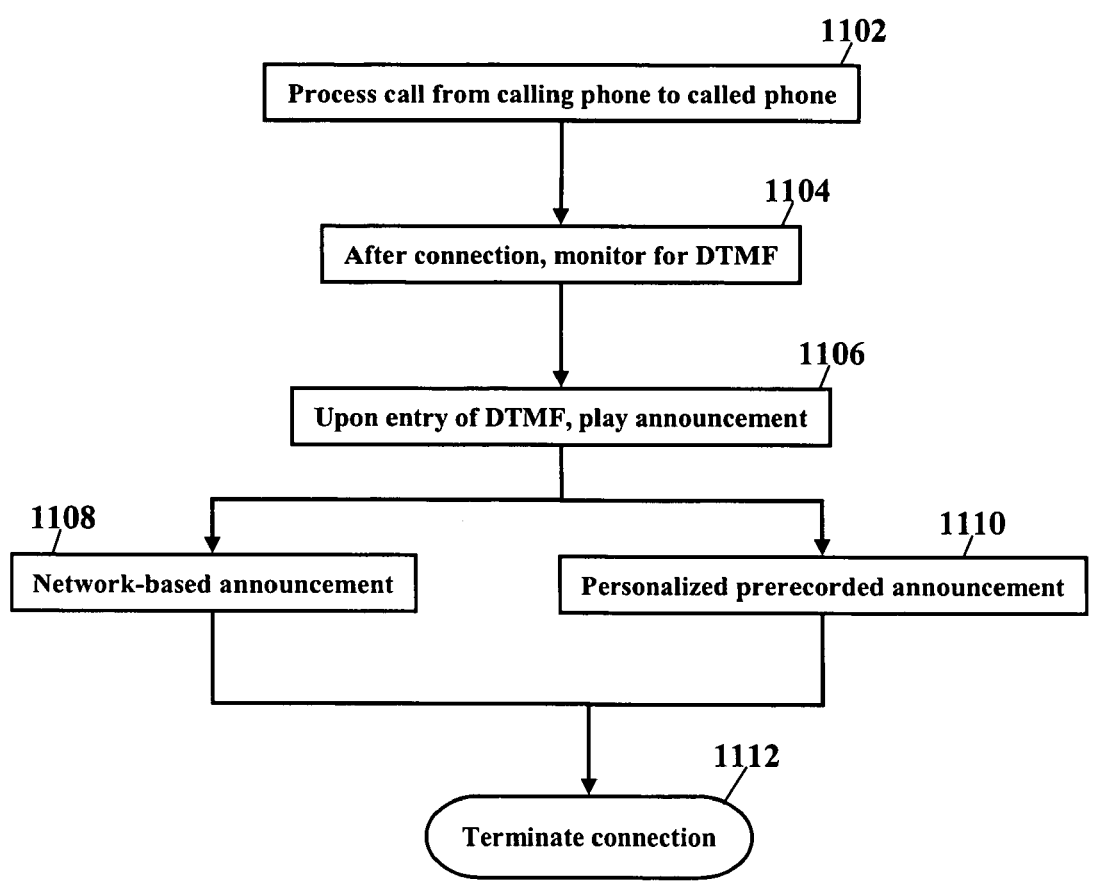
FIG. 11 is a flowchart showing yet another exemplary method of providing privacy screening services.

FIG. 11 is a flowchart showing yet another method of providing privacy screening service. A telephone call is processed from a calling telephone number to a called telephone number (Block 1102). After a connection between the ICLID information and the called telephone number, the telephone call is monitored for entry of a Dual-Tone Multi-Frequency (Block 1104). Upon entry of the Dual-Tone Multi-Frequency, an announcement is played (Block 1106). The announcement may be network-based (Block 1108) or a personalized prerecorded announcement of either party to the telephone call (Block 1110). The connection is then terminated (Block 1112).

According to some of the exemplary embodiments, the privacy screening service may also be available after termination of the telephone call. After the subscriber hangs up the phone, the subscriber could still have an opportunity to screen the calling telephone. Assume the subscriber accepted the call and, after terminating the call, decides to block receipt of future calls from that same calling telephone number. The call screening request could also be recognized after termination of the call. The Privacy Screening Module (shown as reference numeral 20 in FIGS. 1-7) could query the subscriber's profile information. The subscriber's profile information could contain a "last call received" data field. This "last call received" data field stores the ICLID information of the last received call. When the subscriber's telephone is offline, and the when the subscriber enters a predetermined call screening request, this call screening request instructs the Privacy Screening Module (or some other application) to add the ICLID information of the last received call to the customer's profile. The "last call received" data field could even be temporary and change after each incoming call to avoid maintaining a long list of previously received calls. The subscriber could, for example, enter a Dual Tone Multi-Frequency tone to add the last received calling telephone number to the subscriber's profile. The subscriber could then, after termination of the call, add the ICLID information to the Do Not Call list or blocked communications list.

The Privacy Screening Module (shown as reference numeral 20 in FIGS. 1-7) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Privacy Screening Module to be easily disseminated. A computer program product for providing privacy screening during a telephone call comprises the computer-readable medium and the Privacy Screening Module. The Privacy Screening Module is stored on the computer-readable medium.

The Privacy Screening Module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize this invention is not so limited. Other variations, modifications, and alternative embodiments may be made without departing from the spirit and scope of this invention.

What is claimed is:

1. A method, comprising:
   processing a telephone call from a calling telephone number to a called telephone number;
   after a connection between the calling telephone number and the called telephone number, monitoring the telephone call for a call screening request; and
   upon entry of the call screening request, taking an action in response to the call screening request.

2. The method according to claim 1, wherein taking an action comprises playing an announcement.

3. The method according to claim 1, wherein taking an action comprises terminating the connection.

4. The method according to claim 1, wherein taking an action comprises forwarding the telephone call to voice mail.

5. The method according to claim 1, wherein taking an action comprises storing incoming line identification information of the calling telephone number in a database.

6. The method according to claim 1, wherein taking an action comprises communicating incoming line identification information of the calling telephone number to a Do Not Call list, the Do Not Call list associated with the called telephone number and with at least one other communications address.

7. The method according to claim 1, wherein taking an action comprises updating a subscriber's profile with the incoming line identification information of the calling telephone number, the subscriber's profile list associated with the called telephone number and with at least one other communications address.

8. The method according to claim 1, wherein taking an action comprises storing the incoming line identification information of the calling telephone number in a subscriber's blocked communications list.

9. The method according to claim 1, wherein monitoring the telephone call for the call screening request comprises monitoring for at least one of a Dual-Tone Multi-Frequency, a softkey entry, and a data message.

10. A method, comprising:
    receiving a telephone call from a calling telephone number to a called telephone number;
    connecting the telephone call to the called telephone number;
    receiving a call screening request from the called telephone number; and
    taking an action in response to the call screening request.

11. The method according to claim 10, wherein taking an action comprises playing an announcement.

12. The method according to claim 10, wherein taking an action comprises terminating the connection.

13. The method according to claim 10, wherein taking an action comprises forwarding the telephone call to voice mail.

14. The method according to claim 10, wherein taking an action comprises storing incoming line identification information of the calling telephone number in a database.

15. The method according to claim 10, wherein taking an action comprises communicating the incoming line identification information to a Do Not Call list, the Do Not Call list associated with the called telephone number and with at least one other communications address.

16. The method according to claim 10, wherein taking an action comprises updating a subscriber's profile with the incoming line identification information, the subscriber's profile list associated with the called telephone number and with at least one other communications address.

17. The method according to claim 10, wherein taking an action comprises storing the incoming line identification information of the calling telephone number in a subscriber's blocked communications list.

18. The method according to claim 10, wherein receiving the call screening request comprises receiving at least one of a Dual-Tone Multi-Frequency, a softkey entry, and a data message.

19. A method, comprising:
    receiving a telephone call from a calling telephone number to a called telephone number;
    connecting the telephone call to the called telephone number;
    receiving a call screening request from the called telephone number; and
    playing an announcement to a communications address associated with the calling telephone number.

20. The method according to claim 19, further comprising terminating the telephone call.

* * * * *